US009645576B2

(12) United States Patent
Frangou

(10) Patent No.: US 9,645,576 B2
(45) Date of Patent: May 9, 2017

(54) APPARATUS FOR CONTROLLING A LAND VEHICLE WHICH IS SELF-DRIVING OR PARTIALLY SELF-DRIVING

(71) Applicant: Massive Analytic Ltd., London (GB)

(72) Inventor: George John Frangou, London (GB)

(73) Assignee: Massive Analytic Ltd., London (GB)

( * ) Notice: Subject to any disclaimer, the term of this patent is extended or adjusted under 35 U.S.C. 154(b) by 0 days.

(21) Appl. No.: 14/392,083

(22) PCT Filed: Mar. 11, 2014

(86) PCT No.: PCT/GB2014/000088
§ 371 (c)(1),
(2) Date: Sep. 16, 2015

(87) PCT Pub. No.: WO2014/147361
PCT Pub. Date: Sep. 25, 2014

(65) Prior Publication Data
US 2016/0161950 A1    Jun. 9, 2016

(30) Foreign Application Priority Data
Mar. 19, 2013   (GB) .................................. 1305067.9

(51) Int. Cl.
*G05D 1/00*        (2006.01)
*B60W 30/12*       (2006.01)
(Continued)

(52) U.S. Cl.
CPC .......... *G05D 1/0088* (2013.01); *B60W 30/12* (2013.01); *B60W 30/16* (2013.01);
(Continued)

(58) Field of Classification Search
None
See application file for complete search history.

(56) References Cited

U.S. PATENT DOCUMENTS 8,195,364 B2 *  6/2012  Norris ................. G05D 1/0278
                                                       701/19
8,849,483 B2 *  9/2014  Kuwata ............... G05D 1/0206
                                                       701/21
(Continued)

FOREIGN PATENT DOCUMENTS

DE           19828924 C1     6/1999

OTHER PUBLICATIONS

Zalila et al., "Longitudinal Control of an Autonomous Vehicle Through a Hybrid Fuzzy/Classical Controller", Sep. 27, 1994, WESCON Conference, IEEE Center, Hoes Lane, US, XP000532569, pp. 118-124.

(Continued)

*Primary Examiner* — Krishnan Ramesh
(74) *Attorney, Agent, or Firm* — Iandiorio Teska & Coleman, LLP

(57) ABSTRACT

Apparatus for controlling a land vehicle which is self-driving or partially self-driving, comprising a coarse tuning assembly (1, 2, 3) and a fine tuning assembly (4), the coarse tuning assembly (1, 2, 3) comprising: (a) a sensor interface (1) which measures kinematic parameters including speed and braking, (b) fuzzy descriptions which model guidance, navigation and control of the vehicle, and which include: (i) driver behavior and driving dynamics, (ii) uncertainties due to weather, road conditions and traffic, and (iii) input faults including mechanical and electrical parts, and (c) an adaptive fuzzy logic controller (3), and the fine tuning assembly (4) comprising: (a) inputs from the coarse tuning assembly (1, 2, 3), (b) precognition horizons determining how many future samples of input sensor information are required for an optimum control sequence, (c) a linearized multi-input multi-output regression model extracted from the adaptive (Continued)

fuzzy logic controller (3), and (d) a non-linear dynamic linearized regression controller (4a).

2 Claims, 3 Drawing Sheets

(51) Int. Cl.
*B60W 30/16* (2012.01)
*B60W 30/18* (2012.01)
*B60W 50/00* (2006.01)

(52) U.S. Cl.
CPC ............. *B60W 30/18163* (2013.01); *B60W 2050/0004* (2013.01); *B60W 2050/0006* (2013.01); *B60W 2050/0029* (2013.01); *B60W 2050/0031* (2013.01)

(56) References Cited

U.S. PATENT DOCUMENTS

| | | | |
|---|---|---|---|
| 2008/0195282 A1* | 8/2008 | Norris | G05D 1/0278 701/44 |
| 2008/0195293 A1 | 8/2008 | Norris et al. | |
| 2012/0265380 A1* | 10/2012 | Kuwata | G05D 1/0206 701/21 |

OTHER PUBLICATIONS

Lee et al., "Fuzzy-Logic-Based Torque Control Strategy for Parallel-Type Hybrid Electric Vehicle", Aug. 1998, IEEE Transactions on Industrial Electronics, V45, No. 4, pp. 625-632.

* cited by examiner

APPARATUS FOR CONTROLLING A LAND VEHICLE WHICH IS SELF-DRIVING OR PARTIALLY SELF-DRIVING

This invention relates to control apparatus and, more especially, this invention relates to apparatus for controlling a land vehicle which is self-driving or partially self-driving.

The realisation of self-driving or partially self-driving vehicles is complex, depending on the level of human driver involvement. Requirements include support of lane-keeping and warning systems, adaptive cruise control, back-up alerts, and parking assistance. Advanced driver assist systems (ADAS), light detection and ranging (LIDAR) and dedicated short-range communication (DSRC) in real time vehicle to vehicle communication are just some of the known technologies under development. These technologies are designed to enable cars to compute the three-dimensional geometry of any situation in real time from images and respond to their surroundings. ADAS for example uses a combination of advanced sensors, such as stereo cameras and long range and short range RADAR, combined with actuators, control units, and integrating software.

Hitherto, the fusion of available sensors and artificial intelligence has not been capable of "seeing" and understanding the vehicle's surroundings as accurately as a human being can. Artificial intelligence could not provide that level of inferential thinking, nor could it communicate in real time with the environment. It was understood that convergence of these sensor and connectivity technologies would increase the inputs that are available for decision making and reduce the need for more sophisticated artificial intelligence.

Model predictive control (MPG) is an optimization-based control strategy that is considered extremely attractive in vehicle autonomous driving scenarios. For example, with respect to an MPC solution, APACC, increases fuel economy using data including sensor, driver behaviour and traffic data and a model predictive controller.

Safe self-driving vehicles have already been built. Google as well as traditional automakers and suppliers have developed self-driving functionality using sensor-based solutions and have a host of new applications in the pipeline. At the same time, a number of organizations, including automotive and high-tech companies and the USDOT, have been focused on the potential for using connected vehicle communication technologies for collision avoidance and traffic management.

Converging sensor-based technologies and connected-vehicle communications supported by advanced control schemes is needed to enable truly autonomous vehicles. However in the last half decade or so, of the advanced control schemes, only linear model predictive control (MPC) has been used in vehicle autonomous driving. The fundamental idea behind all MPC techniques is to rely on predictions of a plant model to compute the optimal future control sequence by minimization of an objective function. MPC models include controlled variables, manipulated variables and disturbance (perturbation) variables. At each sampling instant, the optimisation performed based on new measurement data, and the first control input of the sequence is applied. The remainder of the sequence is discarded and the process is repeated at the next sampling instant in a "receding horizon" manner.

Whilst MPC has its origins in the chemical process industries, there is increasing interest in its application to vehicle autonomous driving, including support of lane-keeping and warning systems, adaptive cruise control, back-up alerts, and parking assistance. Essentially, the application of MPC builds upon the ideas of fuel and time optimal speed planning by bringing the optimisation onboard, providing a natural framework for increased autonomy and reconfiguration, whilst accounting for physical and operational constraints such as finite control authority, passive safety and collision avoidance. Furthermore other improvements are possible such as journey planning that could not otherwise have been known.

Generalized predictive control (GPC) and its derivatives have received special attention. Particularly the ability of GPC to be applied to unstable or time-delayed MIMO systems in a straight forward manner and the low computational demands for static models make it useful for many different kinds of tasks. Systems behaving unexpectedly, human factors, failures and the environment are all factors that contribute to non-linear plant dynamics. The drawback with MPC is that this method is limited to linear models. If nonlinear dynamics are present in the plant, a linear model might not yield sufficient predictions for MPC techniques to function adequately.

The two most general approaches to closed loop identification are direct approach and indirect approach. The direct approach ignores the presence of feedback, and directly identifies the plant by plant input and output data. This has the advantage that no knowledge about the type of control feedback or even linearity of the controller is required. The indirect approach identifies the closed loop, and obtains the open loop model by deconvolution if possible. Obtaining the open loop model is only possible if the controller is known and both the closed loop plant model and the controller are linear.

The control of multivariable multi-input multi-output (MIMO) systems is a common problem in practical vehicle to vehicle and from vehicle to infrastructure communication. Connected-vehicle systems use wireless technologies to communicate in real time. Most existing approaches deal only with uncertainties in driver behaviour and the environmental, assuming that an exact model of the actuators is available. This assumption is rarely satisfied in practice because the actuator parameters may also have uncertainties due to input faults such as mechanical and electrical parts, etc. Adaptive control with actuator uncertainty is not considered, even though this uncertainty results in significant degeneration of controller performance.

It is an aim of the present invention to reduce the above mentioned problems.

Accordingly, the present invention provides apparatus for controlling a land vehicle which is self-driving or partially self-driving, which apparatus comprises a coarse tuning assembly and a fine tuning assembly, the coarse tuning assembly being such that it comprises:
a. a sensor interface which measures kinematic parameters including speed and braking,
b. fuzzy descriptions to model guidance, navigation and control of the vehicle, the fuzzy descriptions including:
   (i) driver behaviour and driving dynamics,
   (ii) uncertainties due to the environment including weather, road conditions and traffic, and
   (iii) input faults including mechanical and electrical parts,
and
c. an adaptive fuzzy logic controller for nonlinear multi-input multi-output systems with subsystems which comprise fuzzification, inference, and output processing, which comprise both type reduction and defuzzification, and which provide stability of a resulting closed-loop system, the adaptive fuzzy logic controller including;
  (i) inference engine identifying relationships using a rule base and outputs as fuzzy sets to a type reducer, and
  (ii) output control demands including torque actuators for a fuzzyfier fuzzifying the signal,
and the fine tuning assembly being such that it comprises:
a. inputs from the coarse tuning assembly,
b. precognition horizons determining how many future samples of input sensor information are required in order to predict an optimum, control sequence to change the driving dynamics,
c. a linearized multi-input multi-output regression model extracted from the adaptive fuzzy logic controller at each time step providing fine tuning parameters, and
d. a non-linear dynamic linearized regression controller providing:
  (i) a crisp output signal feeding into artificial precognition adaptive cognized control synthesis computing the optimal future vehicle guidance, navigation and control sequence, and
  (ii) reduced set output and artificial precognition adaptive cognized control synthesis feeding into the artificial Precognition adaptive cognized control linear logic system.

The apparatus may be one which includes a synchronization assembly which optimises the input signal to the output signals, and which comprises cascaded diophantine frequency synthesis (DFS) means which predicts future stabilization output parameters of the vehicle.

The use of neural networks for system identification is a relatively new approach as is fuzzy logic.

The apparatus of the present invention may be regarded as providing artificial precognition (AP) using adaptive (model) cognized control (APACC). The APACC improves upon model predictive control (MPC). Using very complex algorithms, APACC provides a significant level of inferential thinking and realtime communication. With the fusion of available sensors, APACC provides the capability of "cognizing" the vehicle's surroundings giving a genuine 'perception' of the external environment. This goes far beyond what has until now been possible by going some way to toward mimicking the way humans use a combination of stored memories and sensory input to interpret events as they occur and anticipate (cognize) likely scenarios.

Embodiments of the invention will now be described solely by way of example and with reference to the accompanying drawings in which.

Figure 1:
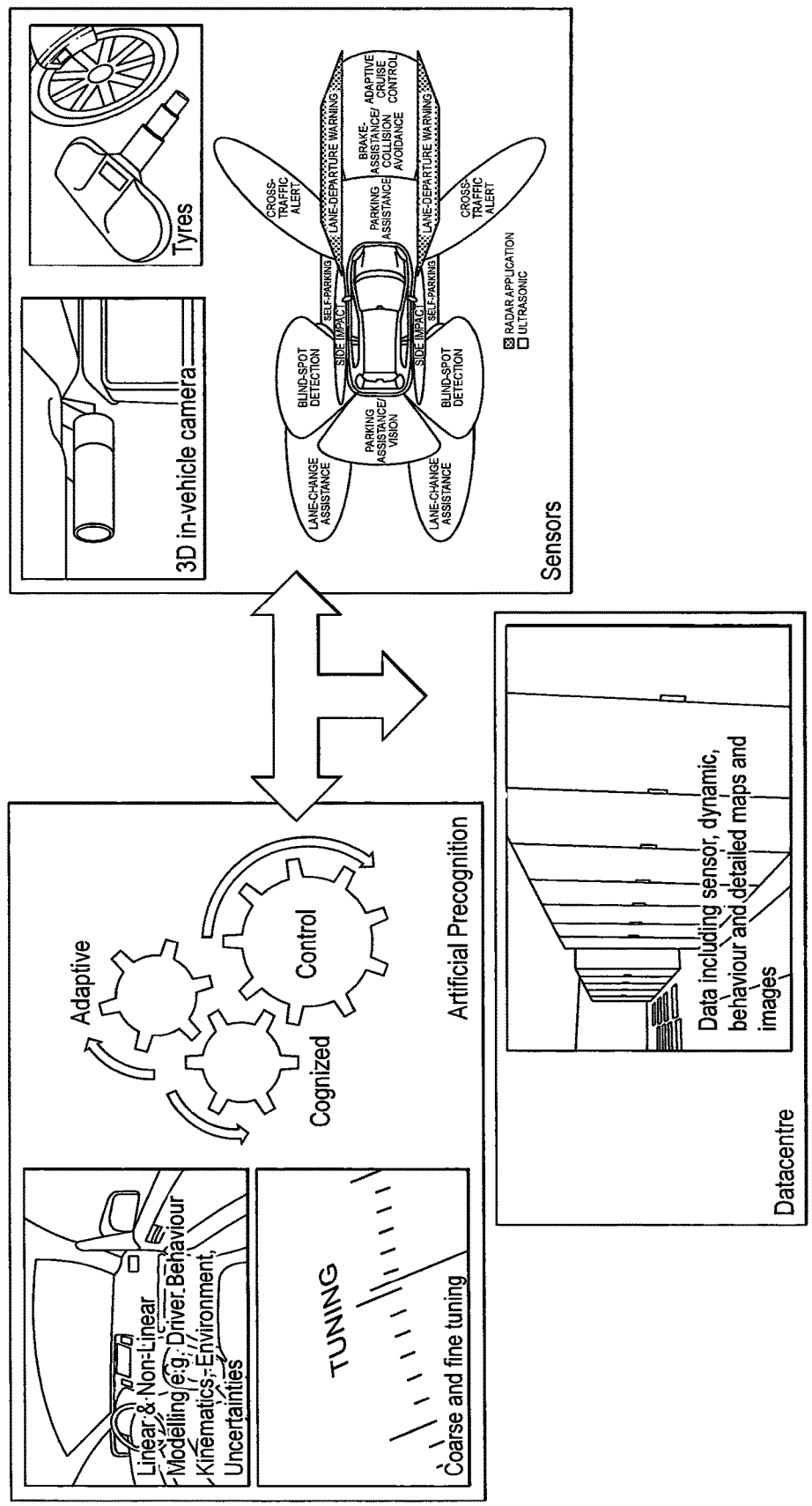
FIG. 1 shows APACC in vehicle autonomous driving.

Referring to the drawings, non-linear vehicle autonomous driving dynamics can be characteristically 'fuzzy' with a high degree of non-linearity. APACC feeds the instantaneous linearization of a nonlinear model with the 'Cognized' output of a fuzzy logic circuit (fuzzyifier in FIG. 2) in each sampling instant. It is similar to GPC in most aspects except that the instantaneous linearization of the fuzzy logic circuit output yields an adaptive linear regression model.

A key benefit of fuzzy logic is that it lets the designer describe the desired system behaviour with simple 'if-then' relations. In many applications, this gets a simpler solution in less design time. In addition, the designer can use all available engineering know-how to optimise the system performance directly. While this is certainly the beauty of fuzzy logic, it has also been a major limitation. In many applications, knowledge that describes desired system behaviour is contained in data sets. Here the designer has had to derive the 'if-then' rules from the data sets manually, which requires a major effort with large data sets. When data sets contain knowledge about the system to be designed, a neural net promises a solution because it can train itself from the data sets.

While neural nets are at advantage by learning from data sets, these have inherent disadvantages; for instance, the cause for a particular behaviour cannot be interpreted, nor can a neural net be modified manually to change to a certain desired behaviour. Also, selection of the appropriate net model and setting the parameters of learning algorithm are difficult and require much experience. On the other hand, fuzzy logic solutions are easy to verify and optimise. The present invention utilises a fuzzy logic controller that automates rule derivation eliminating the need to perform this function manually to predict plant dynamics instantaneously.

Fuzzy control methodologies have emerged in recent years as promising ways to approach nonlinear control problems. Fuzzy control, in particular, has had an impact in the control community because of the simple approach it provides to use heuristic control knowledge for nonlinear control problems. In very complicated situations, where the plant parameters are subject to perturbations or when the dynamics of the systems are very complex, adaptive schemes have to be used online to gather data and adjust the control parameters automatically. However, no stability conditions have been provided so far for these adaptive approaches. APACC introduces two components into its adaptive fuzzy control scheme. One is a fuzzy logic system for coarse tuning. The other is the instantaneous linearization of the fuzzy logic circuit output which yields an adaptive linear model. This acts as a kind of robust compensator, such as supervisory control, sliding-mode control, for the fine tuning.

Recently, several stable adaptive fuzzy control schemes have been developed for multiple-input-multiple-output (MIMO) nonlinear systems. However, these adaptive control techniques are only limited to the MIMO nonlinear systems whose states are assumed to be available for measurement. In many practical situations, state variables are often unavailable in nonlinear systems. Thus, the output feedback or APACC adaptive fuzzy control is required for such complicated applications. The fuzzy control system controls the MIMO system and maintains the system stability. The coarse and fine tuning improves system performance by reducing the impact of external perturbations, guaranteeing closed-loop stability.

APACC coarse and fine tuning are applied to control the full or partial autonomous driving of a land vehicle, for example a car. They are applied to 3D scene reconstruction; kinematic variables such as speed, braking and those provided by tyre sensors and actuator input uncertainties, to instantaneously cognize possible 3D scene constructions/kinematic/actuator parameters.

Non-adaptive passive methods applied to vehicle autonomous driving assume uncertainties in the 'linear' (e.g. kinematic terms) and also the 'non-linear' (e.g. driver behaviour, environmental, input faults in mechanical and electrical parts) and that an exact model of the actuators is available.

There are three levels of schematic as shown in FIG. 1. In-vehicle camera, sensors, ADAS, LIDAR and DSRC in vehicle to vehicle and vehicle to infrastructure technologies shown in FIG. 1 generate specific real-time vehicular data. This vehicular data is combined with actuators, control units, and integrating software, to enable cars to monitor and respond to their surroundings. These sensor-based, driver-assisted solutions, using 3D or stereo cameras can compute the three-dimensional geometry of any situation in front of a vehicle in real time from the images it sees. The vehicular data is combined in real-time with driver behaviour, environmental (e.g. weather, road condition, traffic) maps and images stored in a high performance computing (HPC) data centre. This provides a 'perception' of the external environment; the fusion of available sensors and APACC provides the capability of "cognizing" the vehicle's surroundings. This simulates the way humans use a combination of stored memories and sensory input to interpret events as they occur and anticipate likely scenarios. Using very complex algorithms, APACC provides a level of inferential thinking and real-time communication.

Figure 2:
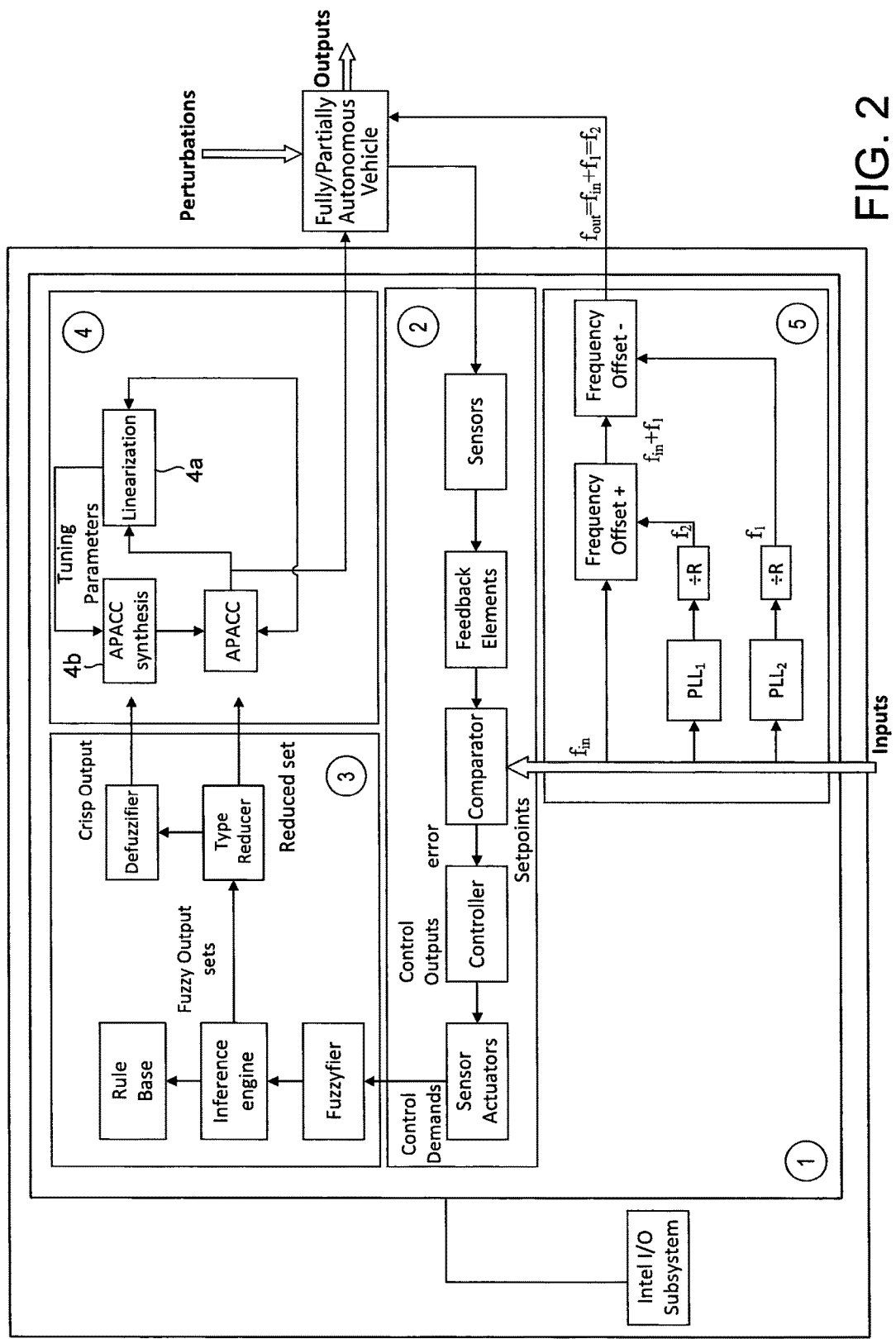
FIG. 2 shows a computer hardware core system for artificial precognition using APACC in vehicle autonomous driving.

FIG. 2 shows how APACC is used for vehicle autonomous driving. The design in controlling vehicle dynamics requires sensors, actuators and algorithms to command the actuators based on (1) sensor measurements of the vehicles current dynamics and (2) specification of a desired dynamics.

The fully and partially autonomous vehicle has an output corresponding to automatic dynamic motion of as a consequence of the application of APACC. The essential components for artificial precognition are embedded as subsystems within a high performance computer hardware core system datacenter implementation 1 shown in FIG. 2. The detailed implementation of the core system is shown in FIG. 2. The inputs include perturbations to the vehicle. The inputs will include a great number of variables including kinematic variables such as speed, braking and those provided by tyre sensors and actuator input uncertainties. Input/output is managed by a multivariable multi-input multi-output (MIMO) subsystem 2 as shown in FIG. 2. The sensor deltas are measured by sensors through a sequential control process which comprises feedback measurement (feedback elements) and a comparator that compares the differential between the input and output signals. The MIMO subsystem 2 is driven to different operating states using set points which are added to the input signal at the comparator. The actual excitation signal amplitude has to be as large as possible to ensure maximal excitation around each set point. APACC instantaneously compensates the error between the actual and cognized (possible and probable) outputs (e.g. throttle control and steering) to provide car dynamic stability. This error is shown in the MIMO subsystem 2 as being fed into a controller which provides control outputs to actuators. The sensor actuator applies the mechanical action needed to change vehicle direction or speed.

The coarse tuning is provided by the adaptive fuzzy logic controller 3 shown in FIG. 2. It has been developed for nonlinear MIMO systems involving external perturbations using fuzzy descriptions to model car guidance, navigation and control. The adapative fuzzy logic controller is a Type-2 fuzzy logic system involving the operations of fuzzification, inference, and output processing. The sensor actuators output control demands to the fuzzyfier which 'fuzzyfies' the signal. There are variables (mentioned above) within the inputs that are closely correlated, and they will have high mutual information. However, there are other pairs of variables that are related that will have low correlation, but high mutual information. The coarse tuning radically speeds up the cognition process making it possible to make virtually instantaneous dynamic correction possible. The inference engine identifies these relationships using the rule base and outputs these as 'fuzzy sets' to the type reducer. The adaptive fuzzy logic controller provides "output processing" and comprises both type reduction and defuzzification.

Type reduction (reduced set) captures more information about rule uncertainties than does the defuzzified value (a crisp number), however, it is computationally intensive. The advantage is that it can cognize unpredicted perturbations-data uncertainties. The adaptive fuzzy controller can perform successful control and guarantee that the global stability of the resulting closed-loop system and the tracking performance can be achieved.

The adaptive fuzzy logic controller output processing is fed into a non-linear dynamic linearized regression controller 4 shown in FIG. 2, and which provides fine tuning. the crisp output signal feeds into APACC synthesis. The reduced set output and the APACC synthesis feed into the APACC linear logic system. The linearized MIMO regression model that is extracted from the fuzzy logic controller at each time step is used to provide the 'fine' tuning parameters. Non-linear dynamic linearized regression controller computes the optimal future guidance, navigation and control sequence according to the objective function. Two 'precognition horizons' determine how many future samples the objective function considers for minimization and the length of the control sequence that is computed. As is common in most MPC methods, a receding horizon strategy is used and thus only the first control signal that is computed is actually applied to the vehicle systems to achieve loop closure.

Synchronization optimization of the input signal to the output signals is achieved using cascaded diophantine frequency synthesis (DFS) implemented using two or more phase lock loops (PLL). The DFS is DFS 5 in FIG. 2. The DFS 5 is used to predict future outputs of continuous-time, infinite-dimensional, time-varying and non-linear systems. Its primary function is to parameterize vehicle stabilization factors and lock them into a continuous feedback loop.

The APACC for guidance, navigation and control (GNC) of the land vehicle requires the virtually instantaneous analysis of enormous data volumes. To achieve this, the convey high performance computing (HPC) architecture from Intel® was selected for APACC vehicle autonomous driving. Convey computer's approach provides very fast access to random access to memory, and is very useful for the complex functions used in APACC.

Figure 3:
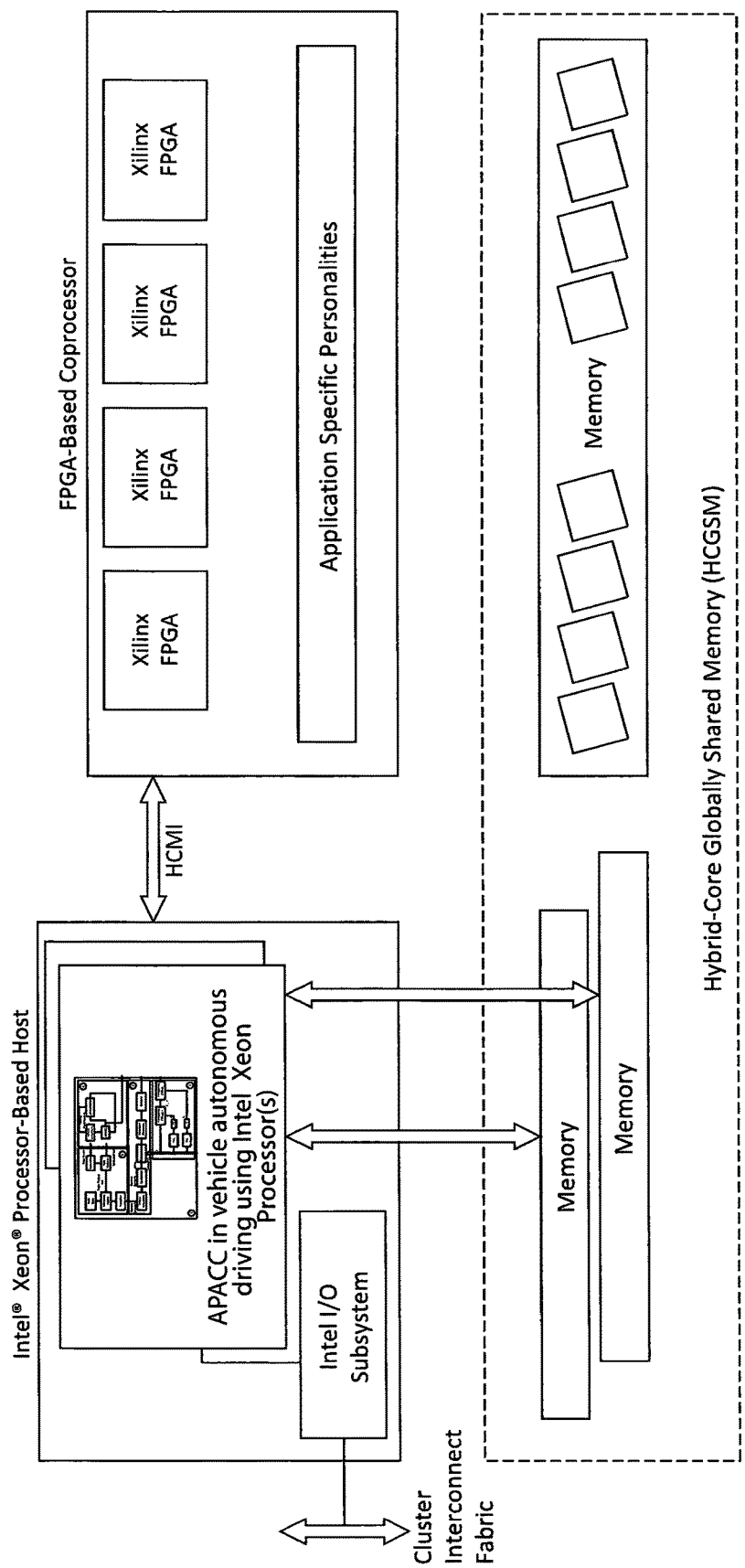
FIG. 3 shows Intel® Xeon® processor high performance computing for APACC in vehicle autonomous driving.

The architecture is based on Intel® Xeon® processor shown in FIG. 3. The architecture features a highly parallel memory subsystem to further increase performance. Programmable "on the fly," FPGAs are a way to achieve hardware-based, application-specific performance. Particular APACC-GNC algorithms, for example, are optimized and translated into code that is loaded onto the FPGAs at runtime.

An in-vehicle camera, sensors, ADAS, LIDAR and DSRC in vehicle to vehicle and vehicle to infrastructure technologies present inputs to APACC for fully or partial vehicle autonomous driving.

The APACC assembly comprises:
a. sensors measuring vehicle dynamics:
   (i) input surfaces locally exposed to vehicle perturbations, and
   (ii) input parameters include kinematic and those provided by tyre sensors and actuator input uncertainties, b. actuators applying operations including steering, throttle and braking to change vehicle vectors, and
c. algorithms commanding the actuators based on (1) sensor measurements of the current vector and (2) specification of a desired vector.

The APACC mimics the way humans use a combination of stored memories and sensory input to interpret events as they occur and anticipate (cognize) likely scenarios.

The multivariable multi-input multi-output (MIMO) subsystem 2 comprises a sensor assembly essentially comprising a sequential control process measuring feedback and a comparator comparing the differential between the input and output signals. The MIMO subsystem 2 operates as follows.
  a. The MIMO subsystem 2 is driven to different operating states using set points added to the input signal at the comparator.
  b. APACC instantaneously compensates the error between the actual and cognised (possible and probable) outputs including throttle control and steering providing car dynamic stability.
  c. To ensure maximal excitation around each set point, the excitation signal amplitude is maximized.
  d. The error is fed into the controller providing control outputs to sensor actuators providing the mechanical action needed to change vehicle direction or speed.

The high performance computing (HPC) architecture provides very fast access to random access to memory for virtually instantaneous analysis of enormous data volumes for car guidance, navigation and control.

It is to be appreciated that the embodiments of the invention described above with reference to the accompanying drawings have been given by way of example and with reference to the accompanying drawings. Individual components shown in the drawings are not limited to use in their drawings and they may be used in other drawings and in all aspects of the invention.

The invention claimed is:

1. Apparatus for controlling a land vehicle which is self-driving or partially self-driving, which apparatus comprises a coarse tuning assembly and a fine tuning assembly, the coarse tuning assembly being such that it comprises:
  a. a sensor interface which measures kinematic parameters including speed and braking,
  b. fuzzy descriptions to model guidance, navigation and control of the vehicle, the fuzzy descriptions including:
    (i) driver behaviour and driving dynamics,
    (ii) uncertainties due to the environment including weather, road conditions and traffic, and
    (iii) input faults including mechanical and electrical parts,
  and
  c. an adaptive fuzzy logic controller for nonlinear multi-input multi-output systems with subsystems which comprise fuzzification, inference, and output processing, which comprise both type reduction and defuzzification, and which provide stability of a resulting closed-loop system, the adaptive fuzzy logic controller including:
    (i) inference engine identifying relationships using a rule base and outputs as fuzzy sets, to a type reducer, and
    (ii) output control demands including torque actuators for a fuzzyfier fuzzifying the signal,
and the fine tuning assembly being such that it comprises:
  a. inputs from the coarse tuning assembly,
  b. precognition horizons determining how many future samples of input sensor information are required in order to predict an optimum control sequence to change the driving dynamics,
  c. a linearized multi-input multi-output regression model extracted from the adaptive fuzzy logic controller at each time step providing fine tuning parameters, and
  d. a non-linear dynamic linearized regression controller providing:
    (i) a crisp output signal feeding into artificial precognition adaptive cognized control synthesis computing optimal future vehicle guidance, navigation and control sequence, and
    (ii) reduced set output and artificial precognition adaptive cognized control synthesis feeding into the artificial precognition adaptive cognized control linear logic system.

2. Apparatus according to claim 1 and including a synchronization assembly which optimises the input signal to the output signals and which comprises cascaded diophantine frequency synthesis means which predicts future stabilization output parameters of the vehicle.

* * * * *